US005659940A

United States Patent [19]
Bielfeldt

[11] Patent Number: 5,659,940

[45] Date of Patent: Aug. 26, 1997

[54] METHOD FOR THE CONVERSION OF A BOARD MANUFACTURING PLANT

[75] Inventor: Friedrich Bernd Bielfeldt, Paehl, Germany

[73] Assignee: Maschinenfabrik J. Dieffenbacher GmbH & Co., Eppingen, Germany

[21] Appl. No.: 233,797

[22] Filed: Apr. 26, 1994

[30] Foreign Application Priority Data

Apr. 26, 1993 [DE] Germany .......................... 43 13 606.0

[51] Int. Cl.[6] ...................................................... B23P 19/00

[52] U.S. Cl. ........................ 29/401.1; 29/407.01; 29/434; 29/426.3; 100/154

[58] Field of Search .................................... 29/401.1, 404, 29/434, 426.3; 100/35, 154; 156/583.5; 425/371

[56] References Cited

U.S. PATENT DOCUMENTS

| | | | |
|---|---|---|---|
| 4,301,958 | 11/1981 | Hatakenaka et al. | 29/430 X |
| 4,417,866 | 11/1983 | Sitzler | 425/364 |
| 4,449,448 | 5/1984 | Stabler et al. | 100/153 |
| 4,991,281 | 2/1991 | Ikeda et al. | 29/401.1 |
| 5,088,398 | 2/1992 | Biefeldt | 100/154 |

FOREIGN PATENT DOCUMENTS

| | | |
|---|---|---|
| 923 172 | 7/1955 | Germany . |
| 2 215 618 | 3/1972 | Germany . |

*Primary Examiner*—Joseph M. Gorski
*Attorney, Agent, or Firm*—Foley & Lardner

[57] ABSTRACT

A method for converting a board manufacturing plant from a discontinuous method of operation to a continuous one. A pre-assembly and trial start-up of the to-be-installed continuous press is performed at a close-by location during operation of the to-be-replaced press. An appropriate set-up area of sufficient floor strength is established close to the production hall, and the continuous press is designed to have vertical mechanical junctions for the transport of individual modules. These modules, being provided with assembly bridges and lifting devices, are transportable as units resistant to flexure and torsion.

12 Claims, 10 Drawing Sheets

METHOD FOR THE CONVERSION OF A BOARD MANUFACTURING PLANT

BACKGROUND OF THE INVENTION

The invention relates to a method for converting a chip-board, fiber-board and plywood manufacturing plant from a discontinuous to a continuous procedure in which the existing single-stage and multiple-stage press is replaced by a continuous press.

The continuous process in the manufacture of chip board, fiber board and plywood boards has in recent years been increasing in popularity as against discontinuous operation. The reason for this lies both in the improvement in quality of the finished boards and in more economical manufacture and higher output. This trend was brought about by continuous presses which operate with two circulating roller-rod beds serving for support between the hot plates and the steel belts of the press table and the press ram.

Such continuous presses were disclosed by the patent documents DE-PS 923,172, DE-OS 22 15 615, DE-PS 31 17 778, DE-PS 31 40 548 and DE-OS 39 13 991.

The gradual elimination of the existing single-stage or multiple-stage presses and the installation of the new continuous presses, however, has resulted in a long drop-off of board manufacturing equipment, which signifies great losses of income for the operators.

The invention is addressed to the problem of creating a method whereby the changeover of a board-producing apparatus (which includes a chip-board, fiber-board, and plywood manufacturing apparatus) from discontinuous to continuous operation can be achieved in the shortest amount of time.

This problem is solved by the features of the claimed method of the invention. A continuous press for the practice of this method is the subject matter of the claimed apparatus of the invention.

The invention teaches that the down time of board manufacturing equipment when changing over from a discontinuous to a continuous process can be relatively short if, in accordance with the steps described, the complete preassembly and trial start-up of the new continuous press to be installed is performed under load at another location during the operation of the old press. The trial start-up (without heat) is performed such that all of the control functions of the press are tested and initiated, such as:

- adjustment of the steel belt with the driving and end drums in the pressing area,
- adjustment of the steel belt in the return run by means of idler rolls,
- positioning and pressure regulation between the press table and the press ram, and
- controlling the entry gap with a high or low angle adjustment, using moving rubber mats to simulate the continuous pressing process.

One requirement for this is that an appropriate set-up area of sufficient floor strength be established acceptably close to the old, discontinuous press apparatus, in accordance with the characteristics of the invention, and that the continuous press be so designed that it will have vertical mechanical junctions suitable in accordance with the invention for the transport of individual modules, and these modules are provided with assembly bridges and lifting means and are made transportable as units resistant to flexure and torsion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

A method for changing over a board-producing apparatus from a discontinuous method of operation to a continuous method, wherein an existing single-stage or multi-stage press is replaced with a continuous press, the method comprising the steps of:

during an operation of the existing press installation, 1) establishing a pre-assembly space (32) having a covering (tent or shed) and a press foundation (23 and 24) for an acceptable floor loading by the continuous press (1) that is to be set up,
2) the continuous press (1) is assembled completely with a plurality of predetermined individual modules Cn on transportable assembly and transport bridges (17),
3) the continuous press is started up in a test operation under load but without heating, with all of the control functions, and after shutting down the existing press, 4) the discontinuous press is dismantled and removed from the production hall (33),
5) the foundations (38) in the production hall (33) are prepared to receive the continuous press, at the same time the continuous press (1) is taken apart at the junctions (26), the steel bands (3 and 4) are removed, and the loose, revolving production elements (12 and 15) of the continuous press (1) are secured, 6) the individual modules Cn of the continuous press (1) are brought successively, in a predetermined order by means of heavy-duty transport lifting equipment or on tracks (28), to the press location,
7) the individual modules Cn are reassembled to form the continuous press (1) and
8) the new continuous press equipment is placed in operation.

BRIEF DESCRIPTION OF THE DRAWINGS

The accompanying drawings, which are incorporated in and constitute a part of the specification, illustrate presently preferred exemplary embodiments of the invention, and, together with the general description given above and the detailed description of the preferred embodiments given below, serve to explain the principles of the invention. The hollow arrows in the drawings indicate direction of movement.

DETAILED DESCRIPTION OF THE PREFERRED EMBODIMENTS

Figure 1:
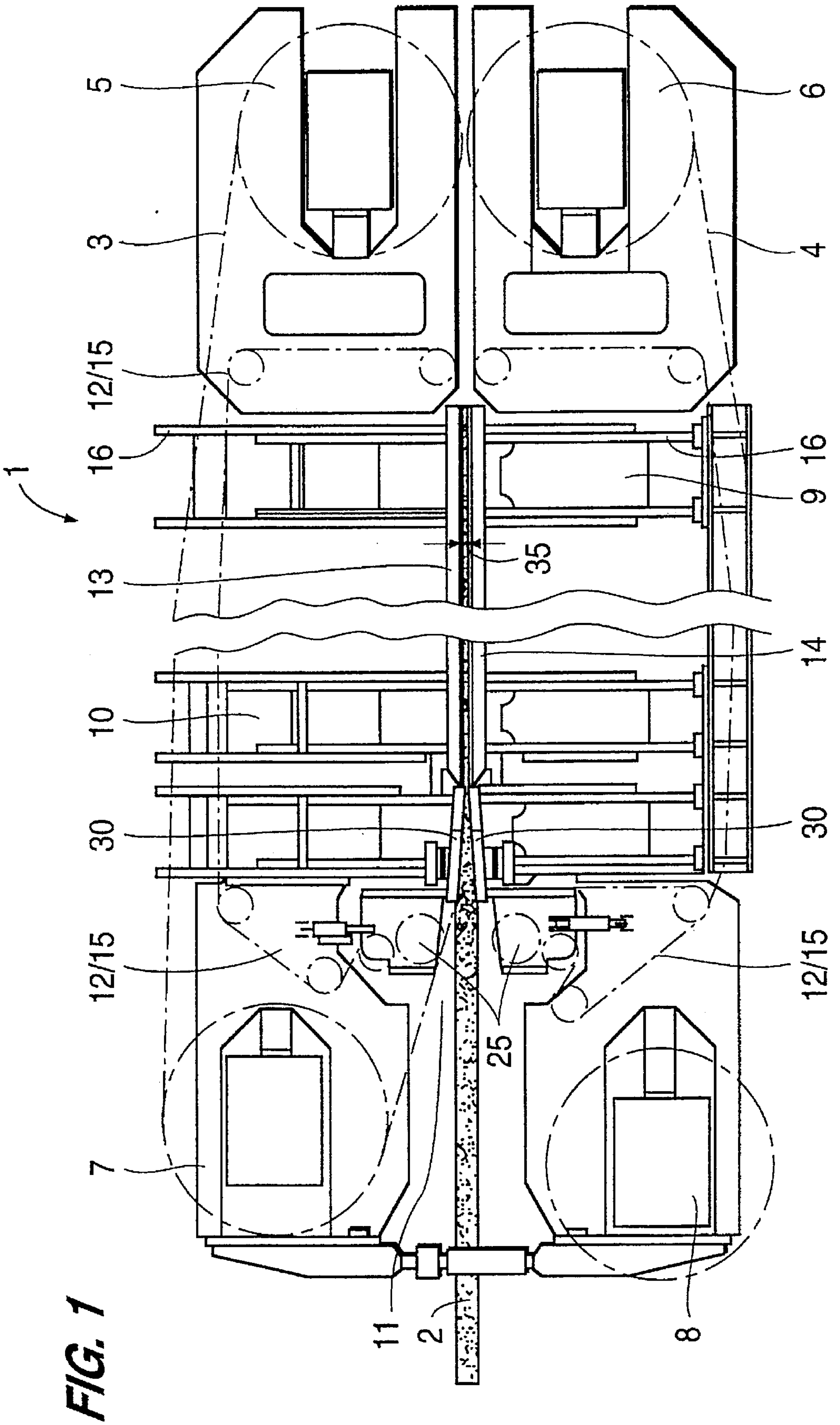
FIG. 1 shows a continuous press according to the invention for installation onto the foundation of an existing single-stage or multi-stage press.

In FIG. 1, the continuous press 1 consists of the press table 9, the movable press ram 10 and the tension members 19 connecting them together. For the adjustment of the press gap 35, the press ram 10 is moved up and down by hydraulic jacks 31 and then locked in the chosen position. The steel bands 3 and 4 are guided each over a drive drum 5 and 6 and end drums 7 and 8, around the press table 9 and the press ram 10. To reduce friction between the heat plates 13 and 14 mounted on the press table 9 and press ram 10 and the moving steel belts 3 and 4, a likewise circulating roller rod apron formed of roller rods 12 is provided. The roller rods 12, whose axes run transversely to the direction of movement of the band are closed up together with a given spacing apart at both of the longitudinal sides of the press 1 in roller chains 15, and are rolled through the press 1 between the heat plates 13 and 14 of press ram 10 and press table 9 on the one hand, and the steel belts 3 and 4 on the other, while carrying the feedstock 2 with them.

In FIG. 1 it can furthermore be seen that the roller rods 12 are positively introduced into the horizontal plane of the press by insertion sprockets 25 disposed at the sides of the entry heat plates 30 in the entry gap 11.

Figures 6, 6A:
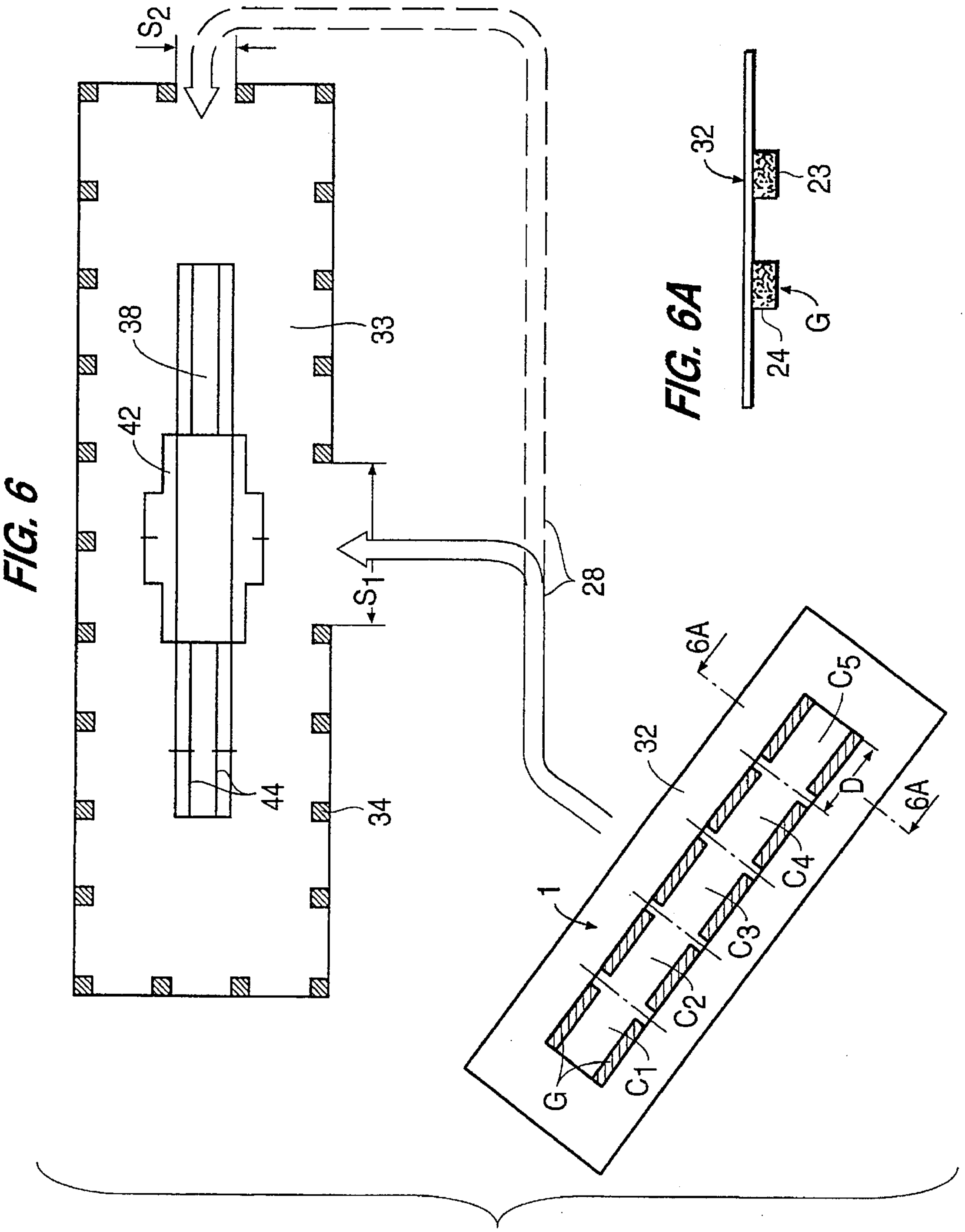
FIG. 6 shows the preliminary assembly area and the production hall, a section of the set up area taken along the section lines.
Figure 7:
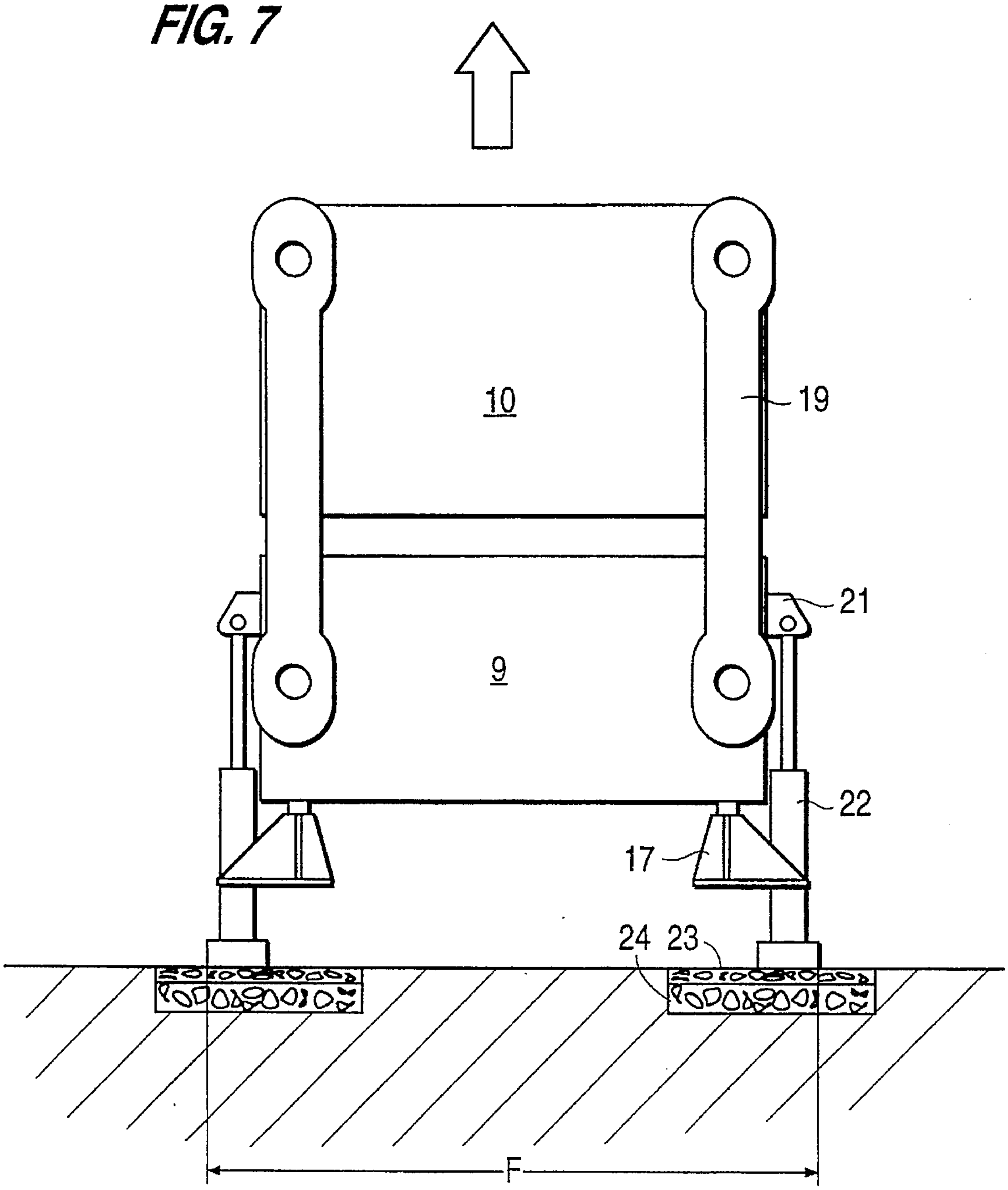
FIGS. 7 to 12 show how a single module is transported from the preliminary assembly area to the foundation in the production hall.

To practice the invention, an appropriate set-up area 32 is required, in accordance with FIG. 6. Instead of a standard floor loading of 6 bar in a machine foundation, a load rating of 1 bar on graveled soil, and on natural ground with vegetation, a load rating of 2 bar can be adequate if, in the foundation strip G in the area where the continuous press is to be set up, as it can be seen in FIG. 4 and FIG. 7, first a layer of mineral concrete or crushed stone 23 of about 20 cm and up is laid, and a lean concrete overlay 24 10 cm thick is applied.

FIG. 6 shows the method according to the invention for the preliminary set-up of a continuous press 1 outside of the production hall 33 on an assembly space 32 provided for the purpose. An appropriate continuous press configured for this purpose is represented in FIGS. 2 to 5.

Figure 2:
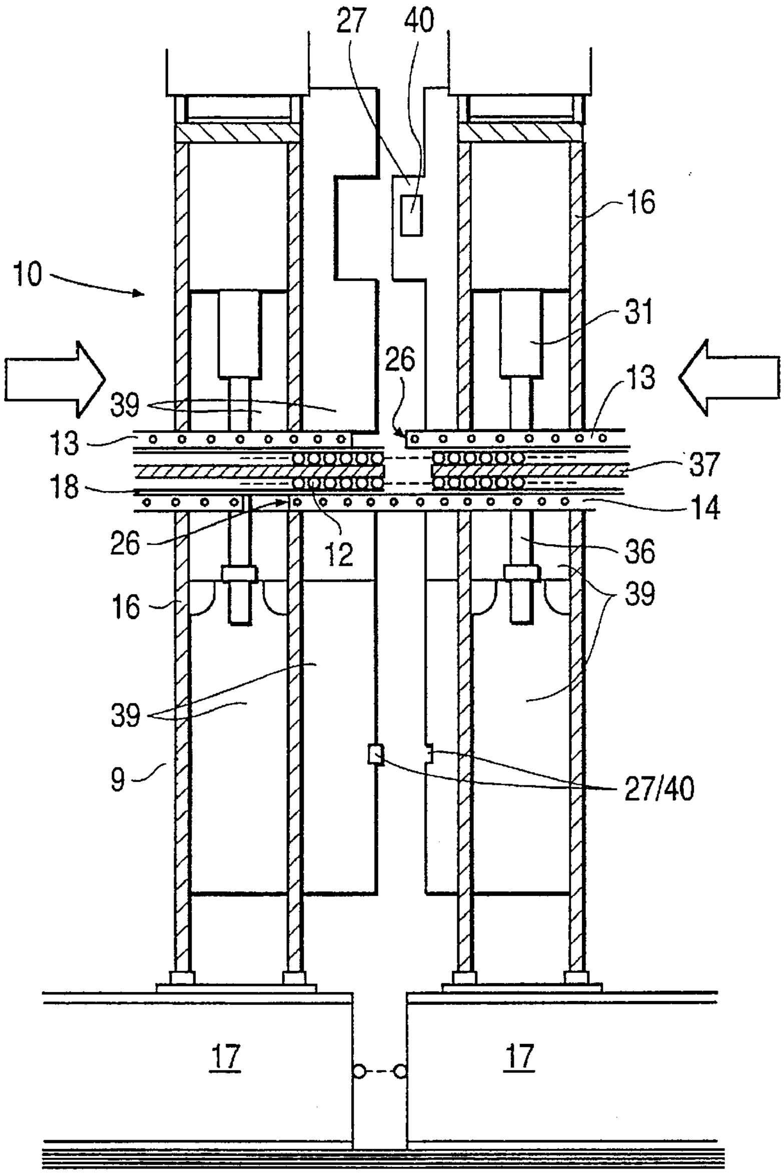
FIGS. 2 to 5 show the continuous press of FIG. 1 as designed for preliminary set-up in an assembly area outside of the production hall.
Figure 3:
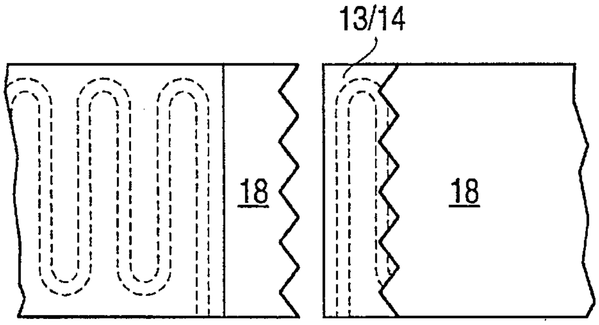
Figure 4:
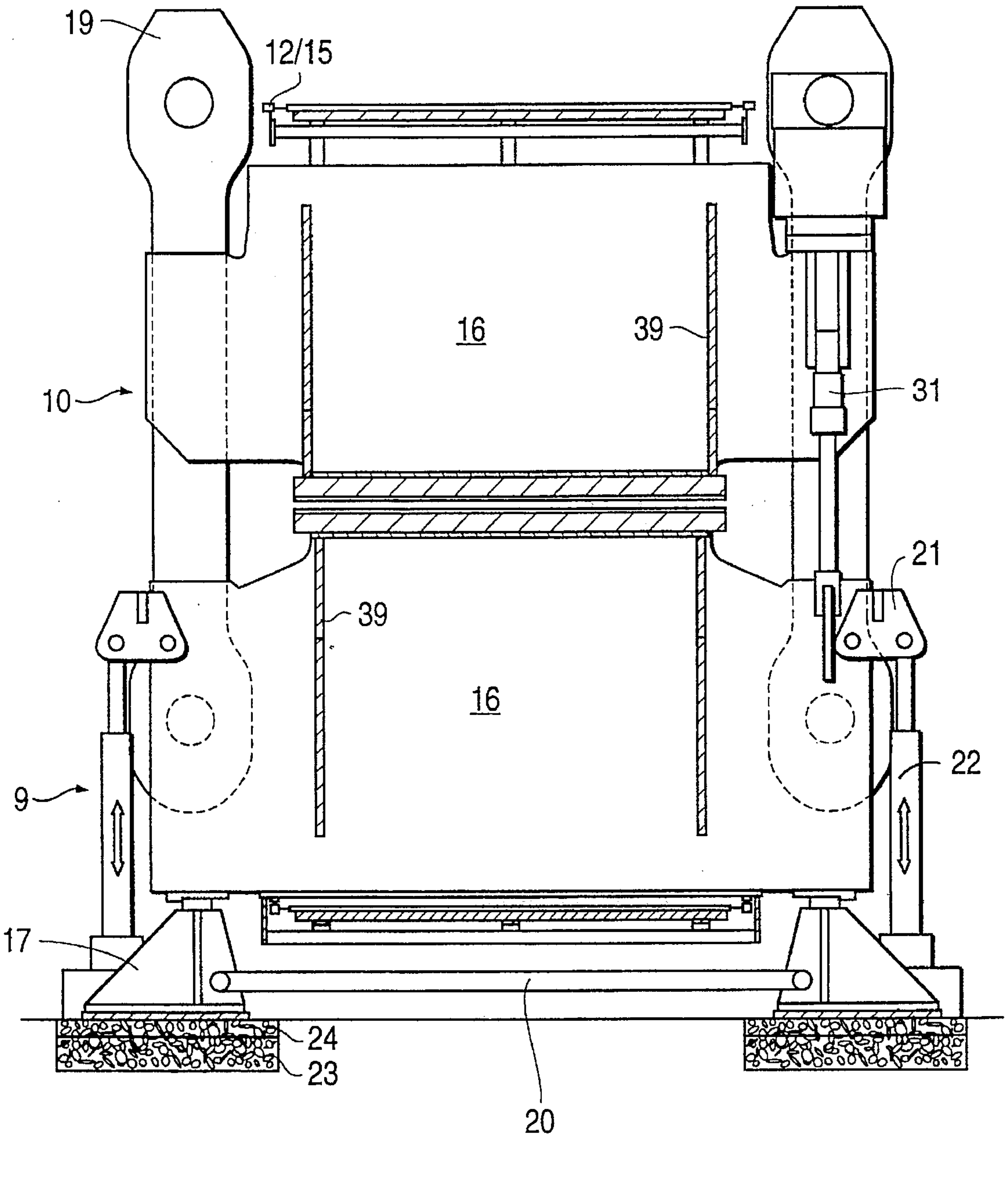

The design for the construction of the continuous press, for its setting up and test run, can be seen in FIGS. 2 to 4, especially its division into a plurality of individual modules Cn. That is, its length is divided into sections. For example, in the case of a total press length of about 50 meters, it is divided into five individual modules C1, C2, C3, C4 and C5 each of 10 meters length and with weights of about 150 to 250 metric tons, and with four vertical mechanical junctions 26. The lengths of the individual modules will be governed preferably by the space available for carrying them into the plant from the set-up area 32 to the final location in the production hall 33; e.g., the clearance S1 between the gate posts 34 is determinative of the length D, if the continuous press is to be introduced laterally, and the width F in the case of lengthwise introduction of the modules Cn through the width S2 between the supporting columns.

On account of the low floor load rating of the set-up area (surface pressure 1 to 2 bar) and for the sake of sufficient strength (flexural and torsional strength) to enable the individual modules to be transported, they are mounted on broad assembly bridges 17 which are in turn joined to one another by several crossbeams 20 to take up the transverse thrust forces. These assembly and transport bridges 17 serve two functions, namely as footings for setting the module up on the plane of the foundation strips G, as a transport bridge for the individual module Cn, and as a footing in the foundation of the production hall 33.

Figure 8:
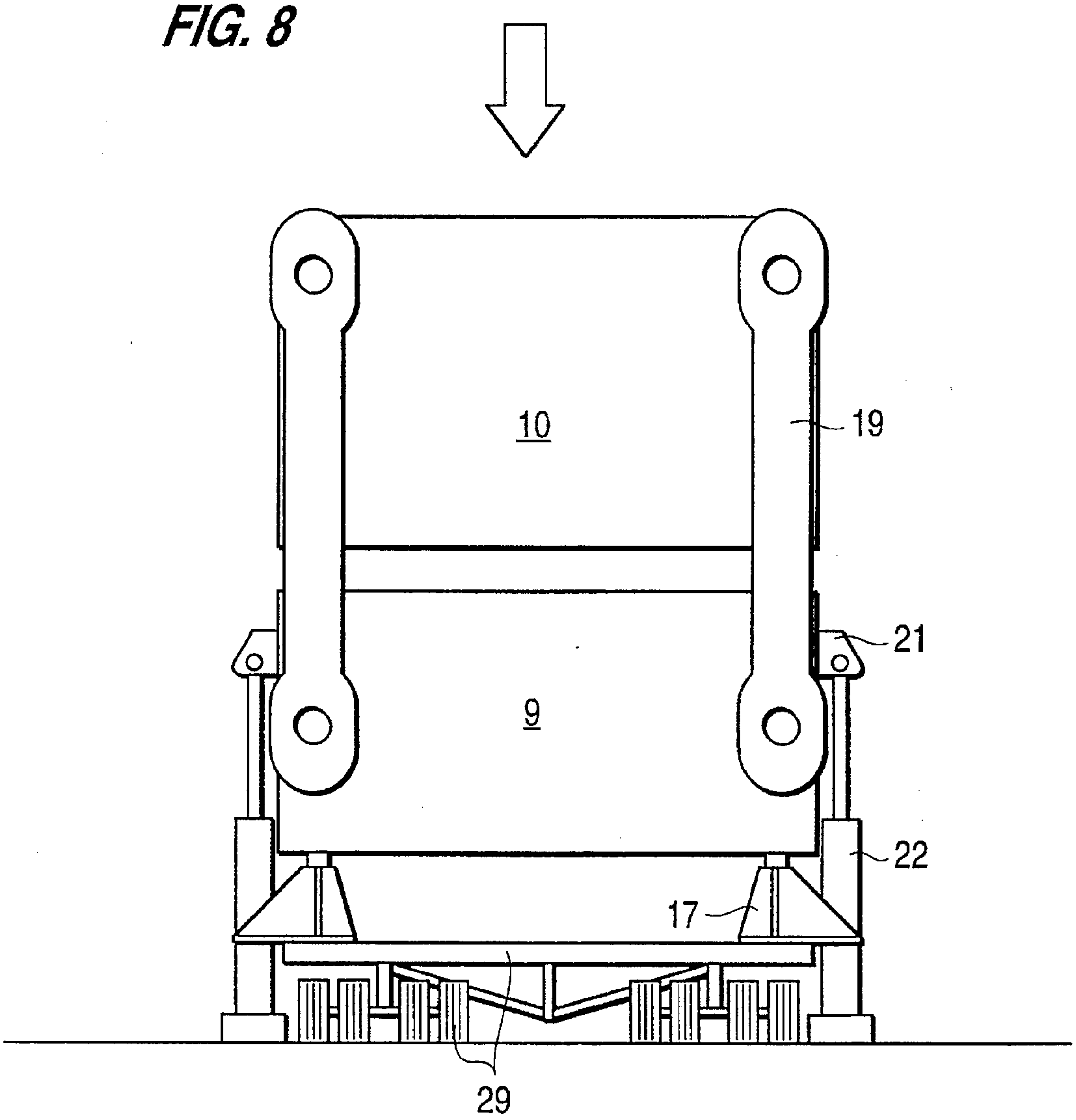
Figure 9:
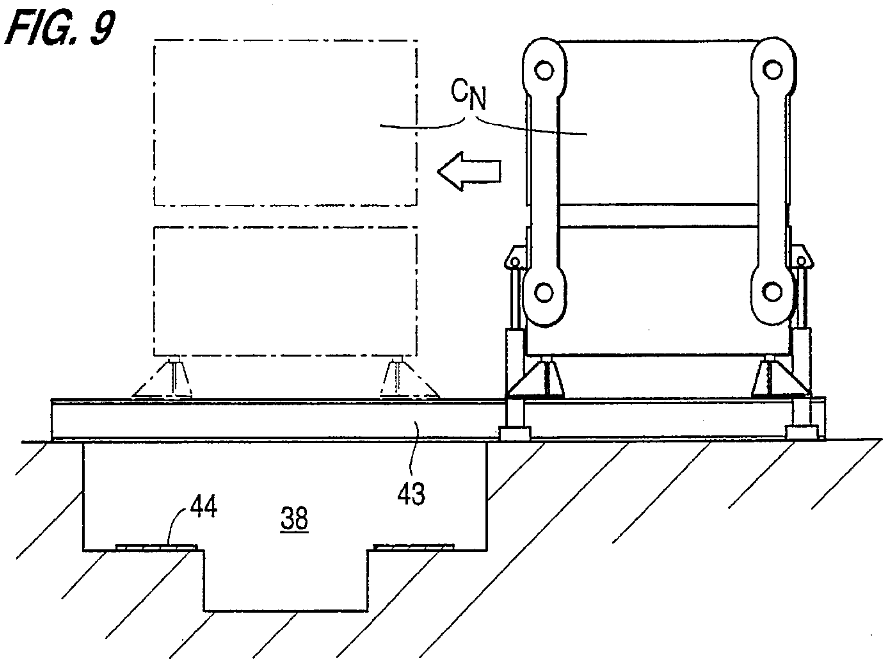
Figure 10:
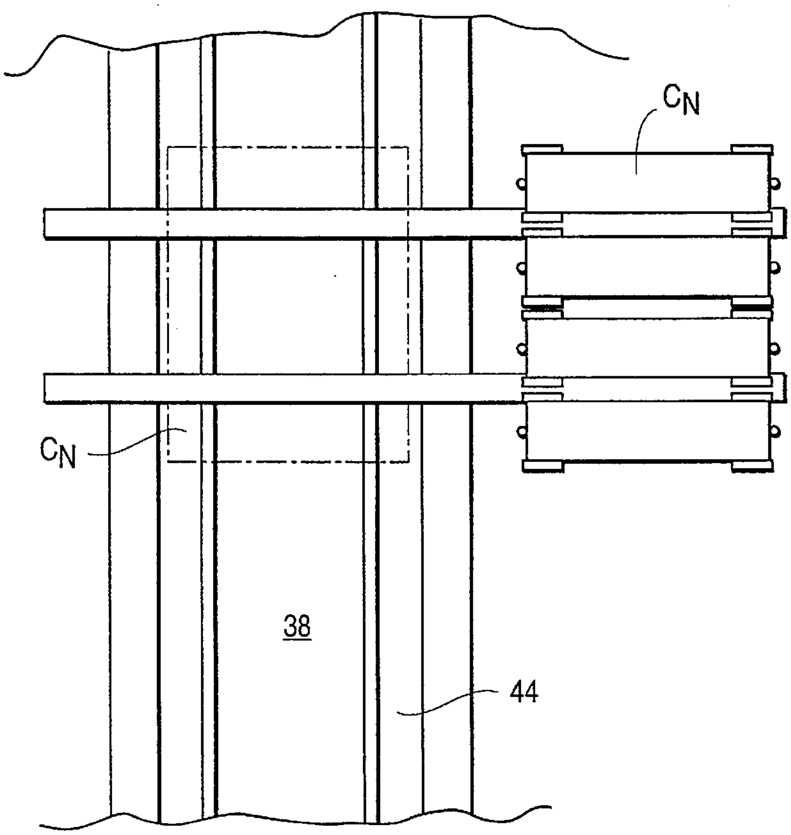
Figure 11:
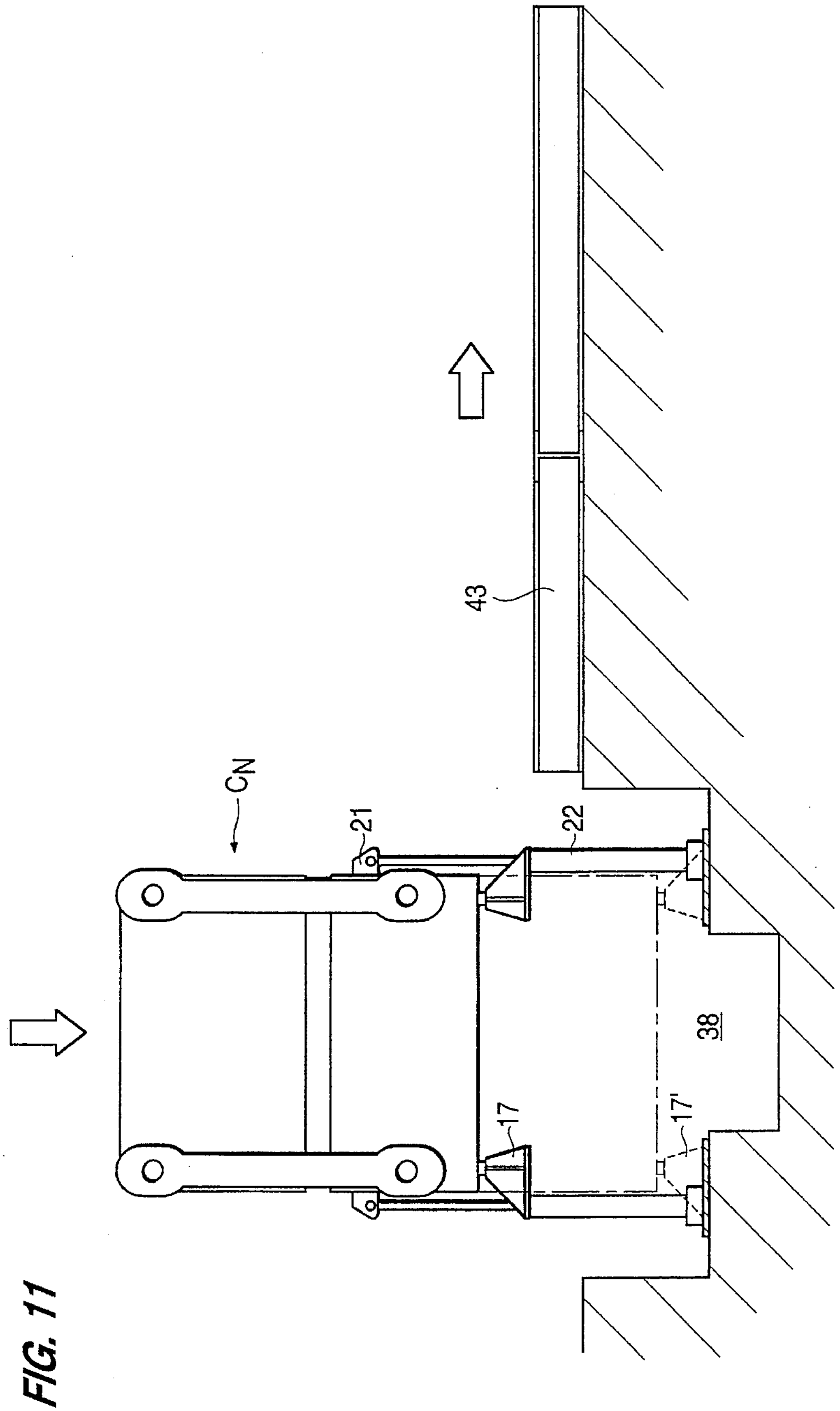
Figure 12:
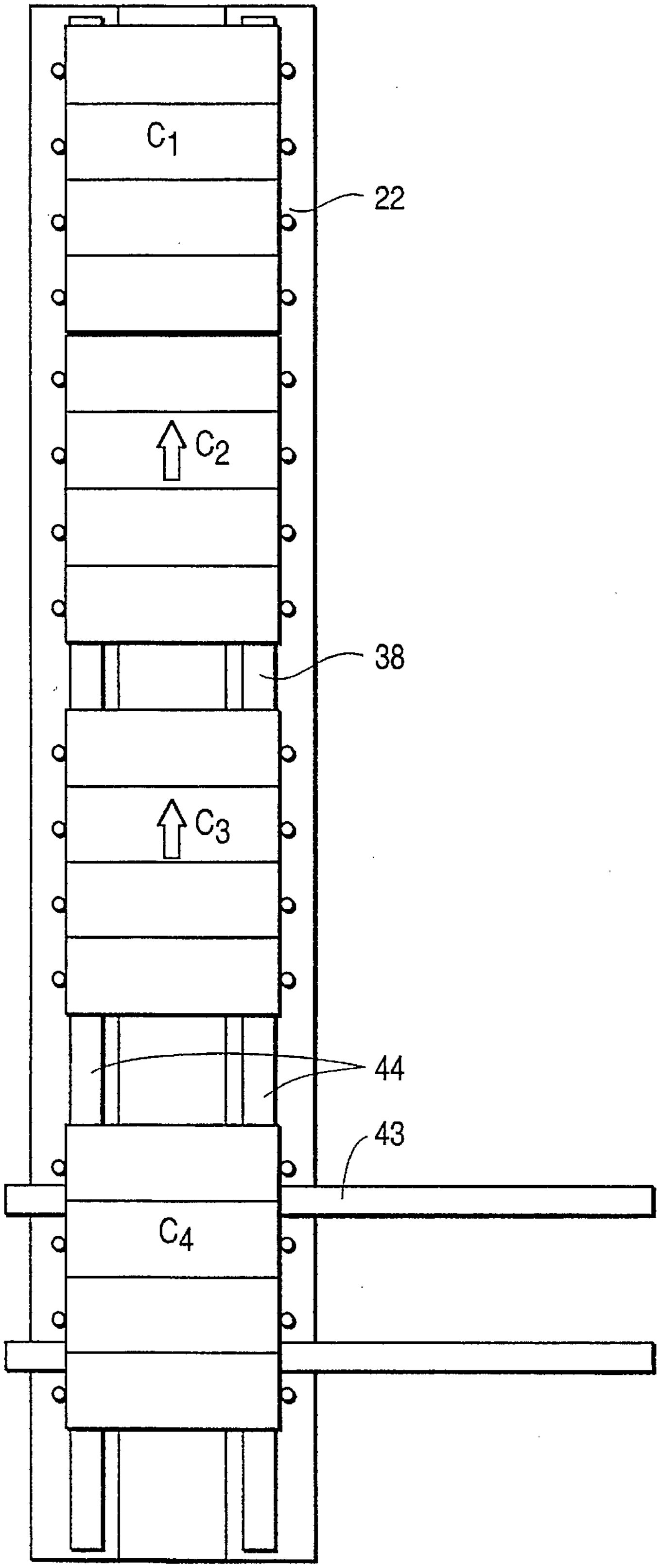

Advantageous embodiments of the individual module Cn consist of:

a) Releasable flange connections 27 between the individual modules Cn, e.g., between module C1 and module C2, to take up horizontal traction and thrust forces during running.

b) Supporting surfaces on which roller rods can roll, e.g., heat plates 13 and 14 with plates 18 are of such size for horizontal telescoping that the junctions 26 of two individual modules C1 and C2 when pushed together will withstand the active hydraulic vertical forces at the "multipot" jack 36 or the vertical thrust forces on the crosswall 16 against these structural elements 16 and/or 36.

c) The roller apron, held together at the outer ends by a guiding roller chain system, is releasably connected by a chain coupling link at top and bottom in the vertical plane of separation between C1 and C2.

d) Upon completion of the initial test start-up the steel bands 3 and 4 are removed. To secure the machine for transport, instead of the steel bands, spacers or boards 37 (preferably of wood) are inserted into the press area between the upper and lower roller rods 12, so that especially the upper roller apron remains fixed in its position.

e) By means of lateral links 21, which are distributed preferably releasably and uniformly on the long sides of the modules Cn by hooking them in laterally, the module units can be raised up, individually or even complete, at the mechanical junctions 26, by hydraulic jacks 22 in the set-up location 32, and set down onto heavy load transport means (e.g., air pillows) or dollies 29 (see FIG. 8); in the production hall 33 they can then be lowered onto the prepared foundation 38.

The flexurally stressed horizontal bridge girders 39 and cross members 16 in the area of the press ram and table for supporting the heat plates 13 and 14 are telescoped horizontally into one another such that the vertical cross members 16 (support beams) on the press table 9 and ram 10, if associated statically in the correct dimensions, absorb the vertical thrust forces occurring during operation.

The plates 18 provided on the heat plates 13 and 14 to absorb wear from the roller rods 12 rolling thereon in operation, are also telescoped together at the mechanical junctions 26 when the modules Cn are shifted horizontally, so that the fitting together of the saw-tooth shaped junctions, see FIG. 3, assures that the rods will roll over them continuously.

On the bridge girders 39 of the individual modules Cn, tapered couplings 40 capable of withstanding a great amount of shear are provided on the bridge girders 39 of the modules Cn at the vertical junction points 26, (which are disposed centrally between the press jacks 31 disposed on the outside in a known manner), and when the modules are assembled together telescopically, they automatically produce a connection between the individual modules which are subjected to great stress in operation.

As an alternative to the foundation strips G described above, re-usable steel plates or flat pontoons could be designed on the leveled and possibly machine-tamped ground to hold the assembly bridges 17.

Figure 5:
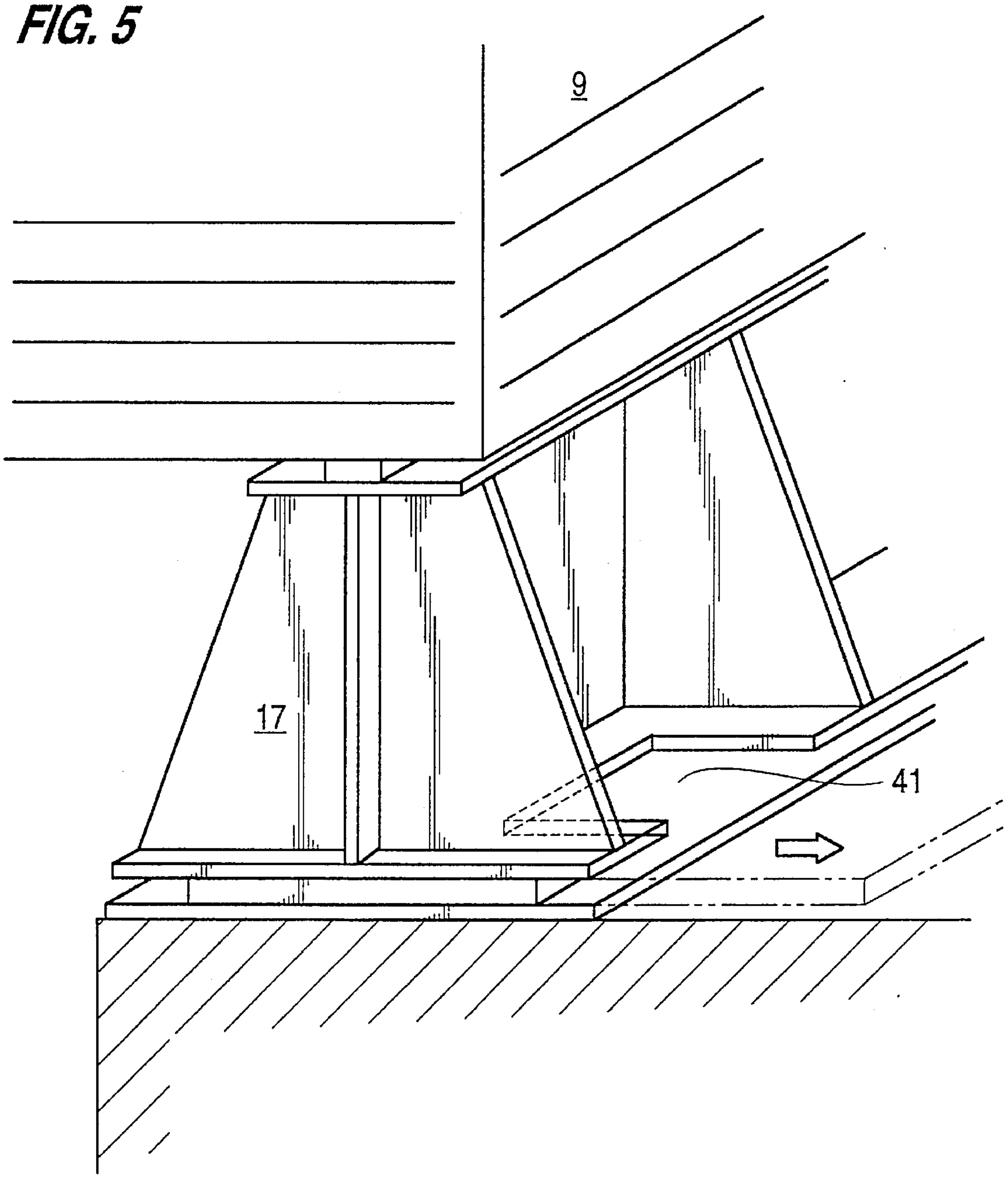

In FIG. 5 there is shown a detail of an individual module Cn wherein the assembly and transport bridges 17 have cut-outs 41 which serve to accommodate the jacks 22.

According to the invention, a continuous press according to FIG. 1 is pre-assembled from individual modules C1 to C5 corresponding to FIGS. 2, 3, 4 and 5 at the set-up area (FIG. 6) and tested. If the tests are satisfactory, the press 42 that is to be replaced can be dismantled and removed from the production hall 33. At the same time, the steel bands 3 and 4 are removed from the continuous press 1 in the set-up area 32, and the press 1 is separated at the junctions 26 into the individual modules C1, C2, C3, C4 and C5. Now the transportation of the individual modules Cn from the set-up area 32 to the production hall 33 can begin. By means of their jacks 22 (see FIG. 7 and FIG. 8), the modules Cn can be raised up in the predetermined order, lowered onto a dolly 29, and moved into the production hall 33. Here they can be lifted with hoisting means to the correct position on the foundation 38 and reassembled to form the continuous press 1. If no appropriate dollies and/or hoisting means are available, the modules Cn are raised again with the jacks 22 and, as shown in FIGS. 7, 9, 10, 11 and 12, rolled on rails 28 into the production hall 33. Telescoping rails 28 here permit running onto the foundation 38. After the hoisting means have been attached and the telescoping rails 28 are withdrawn, the modules Cn can be lowered onto the foundation rails 44 and rolled or pushed to their correct position. When all the modules C1 to C5 have entered, the continuous press 1 can be reassembled and placed in operation.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A method for changing over a board-producing apparatus from a discontinuous method of operation to a continuous method of operation by replacing an existing discontinuous board-producing press with a continuous board-producing press, comprising the steps of:

(a) while operating an existing discontinuous board-producing press in a production hall, performing the following steps:
  (i) establishing a pre-assembly space for a continuous board-producing press that is to be assembled,
  (ii) providing a plurality of modules, which when assembled together constitute the continuous press, with each module supported by at least one transport bridge, and the continuous board-producing press including two pairs of drive drums with a steel band surrounding each pair,
  (iii) attaching the modules together at the pre-assembly space, thereby assembling the continuous board-producing press and supporting it on the transport bridges, and
  (iv) operating the continuous board-producing press under load but without heating, thereby testing the continuous board-producing press, (b) after stopping the existing discontinuous board-producing press, performing the following steps;
  (i) dismantling the existing discontinuous board-producing press and removing it from the production hall,
  (ii) preparing foundations in the production hall to receive the continuous board-producing press, while taking apart the continuous board-producing press by detaching the modules from one another and removing the steel bands from the drive drums, and then securing elements of at least one roller apron of the continuous board-producing press,
  (iii) successively bringing, in a predetermined order, each module of the continuous board-producing press while supported by its transport bridge, respectively, to a press location in the production hall;
  (iv) reassembling the modules to one another at the press location, thereby assembling the continuous board-producing press in the production hall, with the transport bridges supporting the continuous board-producing press, and
  (v) operating the continuous board-producing press in the production hall.

2. The method of claim 1, wherein the steps of attaching and reassembling each include assembling a press table, press ram, two roller aprons, the pairs of drive drums and the steel bands such that each roller apron travels around a respective one of the press table and press ram and each steel band travels over a respective pair of drive drums and around a respective one of said roller aprons, with said roller aprons and steel bands travelling in the same direction, and wherein the steps of attaching and reassembling further each include providing each module with coupling members and joining these coupling members one to another.

3. The method according to claim 2, further comprising the step of determining lengths of the individual modules, which lengths are less than a width between doorposts in the production hall.

4. The method according to claim 2, further comprising the step of determining a width of the individual modules which width is less than a clearance between doorposts in the production hall.

5. The method according to claim 2, wherein each individual module includes two transport bridges, and further comprising the step of reinforcing the transport bridges by attaching a plurality of cross members thereto.

6. The method of claim 2, wherein the step of securing includes attaching coupling links to portions of the roller aprons at vertical junctions between the individual modules.

7. The method according to claim 2 including prior to the successively bringing step, the step of inserting a spacer between the roller aprons.

8. The method according to claim 2, wherein the attaching and reassembling steps each include mounting a plurality of hydraulic jacks on longitudinal sides of the individual modules.

9. The method of claim 1, wherein the step of establishing a pre-assembly space includes providing elongated foundation strips in the ground at the pre-assembly space comprising an at least 20 cm thick mineral concrete slab of fine and coarser ballast covered by a lean concrete layer of at least 10 cm.

10. The method of claim 1, wherein the step of establishing a pre-assembly space includes laying reusable steel plates on a leveled ground at the pre-assembly space.

11. The method of claim 1, wherein each module has a length of about 10 meters.

12. The method of claim 11, wherein each module weighs between about 150 to 250 metric tons.

* * * * *